US012742629B2

(12) United States Patent
Matsubara

(10) Patent No.: US 12,742,629 B2
(45) Date of Patent: Sep. 22, 2026

(54) OPTICAL COHERENCE TOMOGRAPH

(71) Applicant: FURUKAWA ELECTRIC CO., LTD., Tokyo (JP)

(72) Inventor: Noritaka Matsubara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 138 days.

(21) Appl. No.: 18/794,032

(22) Filed: Aug. 5, 2024

(65) Prior Publication Data

US 2024/0393099 A1 Nov. 28, 2024

Related U.S. Application Data

(63) Continuation of application No. PCT/JP2022/046265, filed on Dec. 15, 2022.

(30) Foreign Application Priority Data

Feb. 8, 2022 (JP) ................................ 2022-018011

(51) Int. Cl.

*G01B 9/02091* (2022.01)
*G01B 9/02* (2022.01)
*G02B 6/125* (2006.01)

(52) U.S. Cl.

CPC ..... *G01B 9/02091* (2013.01); *G01B 9/02051* (2013.01); *G02B 6/125* (2013.01); *G01B 2290/35* (2013.01)

(58) Field of Classification Search

CPC ............ G01B 9/02091; G01B 9/02051; G01B 2290/35; G02B 6/125; G02B 6/12; G01N 21/17

(Continued)

(56) References Cited

U.S. PATENT DOCUMENTS

2002/0168146 A1 11/2002 Watanabe
2003/0184758 A1 10/2003 Bjarklev et al.

(Continued)

FOREIGN PATENT DOCUMENTS

JP 2002-341159 A 11/2002
JP 2006-251429 A 9/2006

(Continued)

OTHER PUBLICATIONS

International Search Report issued Jan. 31, 2023 in PCT/JP2022/046265 filed on Dec. 15, 2022, 3 pages.

*Primary Examiner* — Md M Rahman

(74) *Attorney, Agent, or Firm* — Oblon, McClelland, Maier & Neustadt, L.L.P.

(57) ABSTRACT

An optical coherence tomograph includes: a light source configured to output light; a branching portion configured to separate the light from the light source into irradiation light and reference light; a reference optical system configured to transmit the reference light from the branching portion; an irradiation optical system configured to transmit the irradiation light from the branching portion so that an object is irradiated therewith, and transmit reflection light of the irradiation light reflected by the object; a coherence portion configured to generate coherent light by causing the reflection light from the irradiation optical system and the reference light from the reference optical system to be coherent; a coherent light output portion configured to output the coherent light; and a coupling element configured to function as the branching portion and the coherence portion.

12 Claims, 5 Drawing Sheets

(58) Field of Classification Search
USPC .......................................................... 356/479
See application file for complete search history.

(56) References Cited

U.S. PATENT DOCUMENTS

| | | | |
|---|---|---|---|
| 2009/0279098 A1 | 11/2009 | Ohbayashi et al. | |
| 2012/0002918 A1 | 1/2012 | Kawashima et al. | |
| 2013/0121631 A1* | 5/2013 | Yu ...................... | H04B 10/5053 385/2 |
| 2014/0125983 A1 | 5/2014 | Nitkowski et al. | |

FOREIGN PATENT DOCUMENTS

| | | |
|---|---|---|
| JP | 2012-14039 A | 1/2012 |
| JP | 2014-520258 A | 8/2014 |
| JP | 2014-202484 A | 10/2014 |
| JP | 2017-111062 A | 6/2017 |
| WO | WO 2008/090599 A1 | 7/2008 |

* cited by examiner 100A (100)
10A (10)
10a
200
OBJECT
143
MIRROR
142
VARIABLE OPTICAL ATTENUATOR
14
141
VARIABLE DELAYER
12
13
12 (15)
12
12
11
COHERENT LIGHT OUTPUT PORTION
16
30
ISOLATOR
DETEC-TOR
40
20
LIGHT SOURCE 100A (100)
10A (10)
11
14
143
142 (50)
DS
DS
141
10b
141b
141a
12
13 (50)
15
10a
200
16
40
LIGHT SOURCE
20
ISOLATOR
30
X
Y
Z 100B (100)
10B (10)
11
10b
141
141b
141a
13 (50)
15
10a
200
19
16
40
12
14
142 (50)
143
17
17a (50)
12B
18
LIGHT SOURCE
20
ISOLATOR
30
X
Y
Z

OPTICAL COHERENCE TOMOGRAPH

REFERENCE TO RELATED APPLICATION(S)

This application is a continuation of International Application No. PCT/JP2022/046265, filed on Dec. 15, 2022 which claims the benefit of priority of the prior Japanese Patent Application No. 2022-018011, filed on Feb. 8, 2022, the entire contents of which are incorporated herein by reference.

BACKGROUND OF THE INVENTION

Embodiments described herein relate generally to an optical coherence tomograph.

A conventionally-known optical coherence tomograph has a wavelength variable light source and includes functional units that are structured with a waveguide and integrated over a substrate (see, for example, Japanese Patent Application Laid-open No. 2017-111062).

The optical coherence tomograph disclosed in Japanese Patent Application Laid-open No. 2017-111062 includes, as the integrated functional units, a branching portion, a reference optical system, an irradiation optical system, a coherence portion, and a coherent light output portion. The branching portion is configured to branch light from a light source into reference light to be input to the reference optical system and irradiation light to be input to the irradiation optical system. The reference optical system is configured to transmit, after applying a delay thereto or the like, the reference light to the coherence portion. The irradiation optical system is configured to irradiate an object with the irradiation light and to transmit reflection light of the irradiation light reflected by the object, to the coherence portion. The coherence portion is configured to cause the reference light from the reference optical system and the reflection light from the irradiation optical system to be coherent. The coherent light output portion is configured to output the coherent light to a detector. The detector is configured to perform a prescribed process on the optical signal received thereby, so that a tomographic image of the object is obtained.

SUMMARY OF THE INVENTION

In the optical coherence tomograph in Japanese Patent Application Laid-open No. 2017-111062 listed above, the branching portion and the coherence portion are structured separately. For this reason, when there is a difference between a branch ratio of the branching portion and a branch ratio of the coherence portion due to a manufacture variance or the like, there is a possibility that precision levels of measuring processes may be degraded because of the difference.

Thus, for example, it is desirable to provide an optical coherence tomograph that is novel and improved so as to make it possible to inhibit the degradation of the precision levels of the measuring processes that may be caused by a manufacture variance or the like.

In some embodiments, an optical coherence tomograph includes: a light source configured to output light, the light source being configured to vary a wavelength of the light to be output; a branching portion configured to separate the light from the light source into irradiation light and reference light; a reference optical system configured to transmit the reference light from the branching portion; an irradiation optical system configured to transmit the irradiation light from the branching portion so that an object is irradiated therewith, and transmit reflection light of the irradiation light reflected by the object; a coherence portion configured to generate coherent light by causing the reflection light from the irradiation optical system and the reference light from the reference optical system to be coherent; a coherent light output portion configured to output the coherent light; and a coupling element configured to function as the branching portion and the coherence portion. The reference optical system, the coupling element, and the coherent light output portion are structured with a waveguide formed over a substrate and are integrated over the substrate.

The above and other objects, features, advantages and technical and industrial significance of this invention will be better understood by reading the following detailed description of presently preferred embodiments of the invention, when considered in connection with the accompanying drawings.

DETAILED DESCRIPTION

Figure 1:
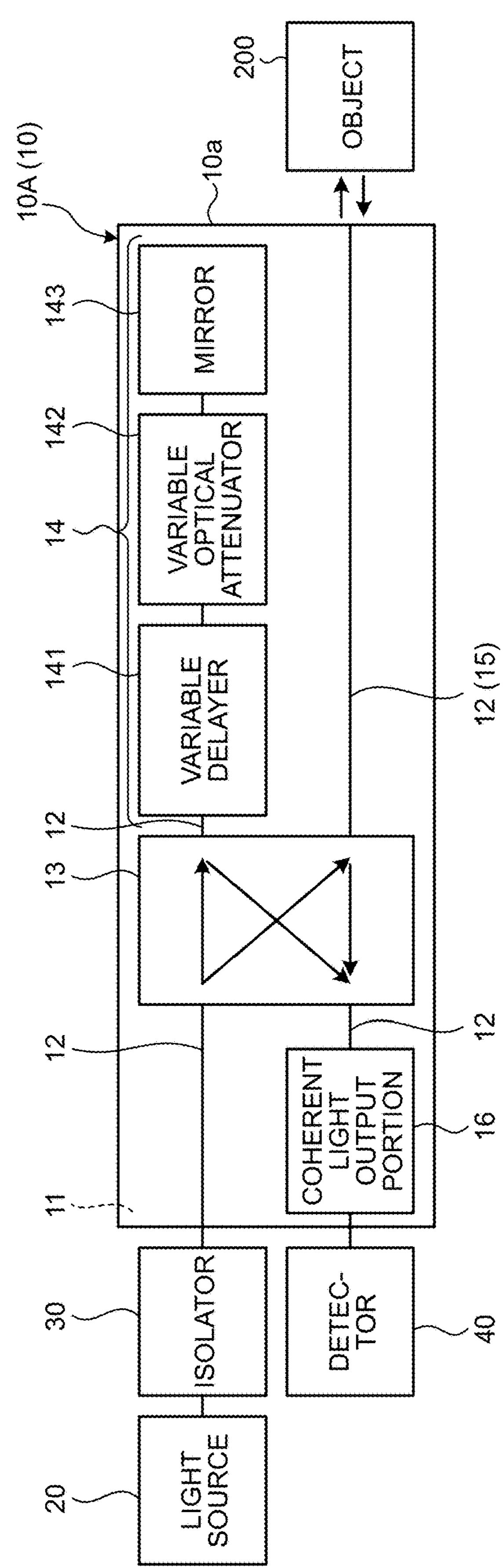
FIG. 1 is an illustrative block diagram of an optical coherence tomograph according to a first embodiment.

The following will describe a plurality of exemplary embodiments of the present disclosure. The configurations of the embodiments described below and the effects and the results (the advantageous effects) brought about by the configurations are merely examples. It is possible to realize the present disclosure by using other configurations besides those disclosed in the following embodiments. Further, with the present disclosure, it is possible to achieve at least one of various types of advantageous effects (which include derivative advantageous effects) realized by the configurations.

The plurality of embodiments described below include certain configurations that are the same as each other. Thus, by using the configurations of the embodiments, it is possible to achieve the same effects and advantageous effects based on the same configurations. Further, in the following explanations, some of the configurations that are the same will be referred to by using the same reference characters, and duplicate explanations thereof may be omitted.

Figure 2:
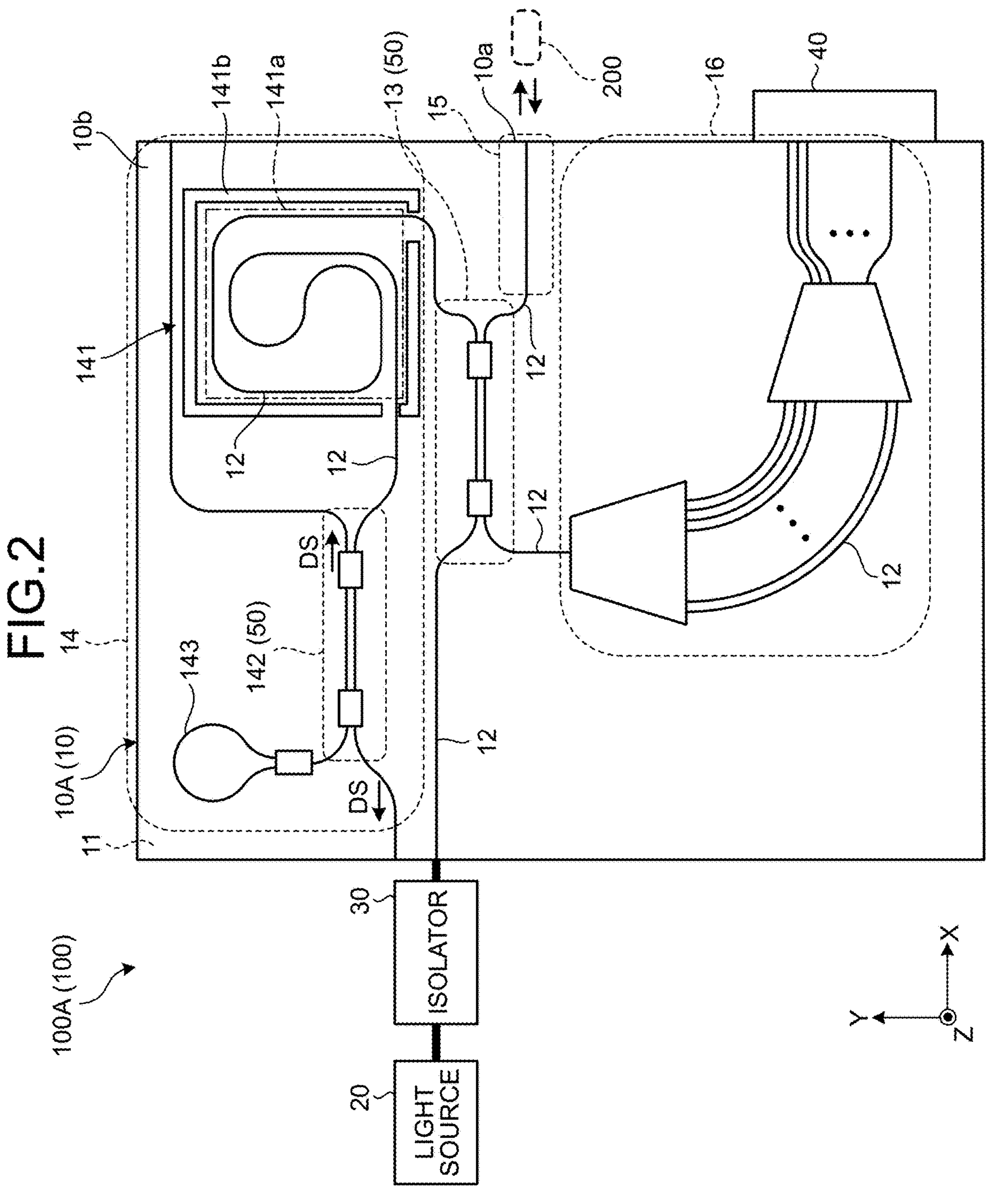
FIG. 2 is an illustrative and schematic plan view of the optical coherence tomograph according to the first embodiment.
Figure 5:
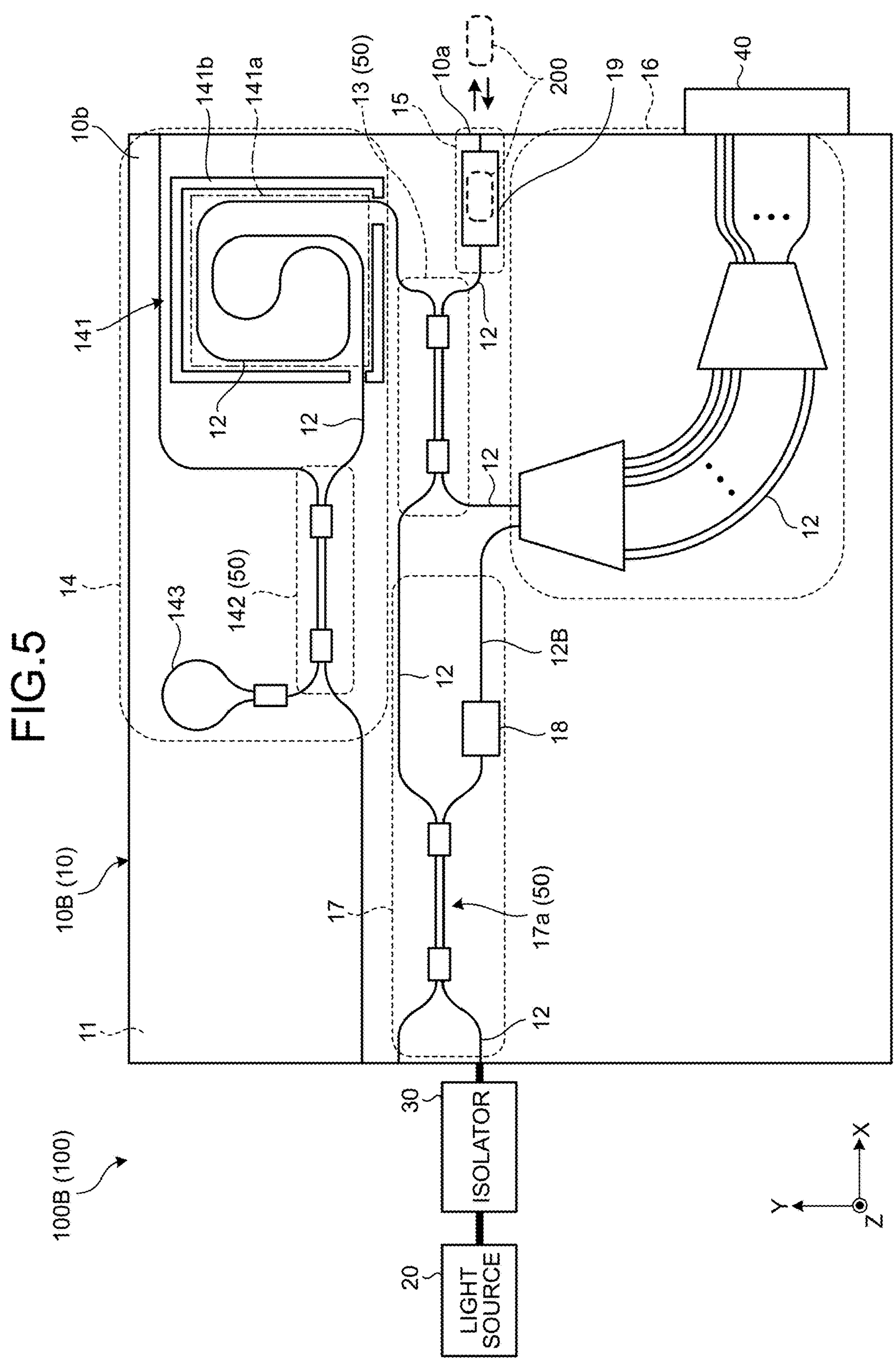
FIG. 5 is an illustrative and schematic plan view of the optical coherence tomograph according to the second embodiment.

In FIGS. 2 and 5, the arrow X indicates an X direction; the arrow Y indicates a Y direction; and the arrow Z indicates a Z direction. The X direction, the Y direction, and the Z direction intersect with one another and are orthogonal to one another. Further, in FIGS. 2 and 5, internal structures are drawn with the solid lines.

Further, the drawings are schematically drawn. Thus, the dimensions in the drawings may be different from those in reality.

First Embodiment

FIG. 1 is a block diagram illustrating a schematic configuration of an optical coherence tomograph 100A (100) according to a first embodiment.

As illustrated in FIG. 1, the optical coherence tomograph 100 includes optical integrated circuitry 10A (10), a light source 20, an isolator 30, and a detector 40.

The light source 20 includes a semiconductor laser element configured to output light (laser light), for example. Also, the light source 20 is a wavelength variable light source capable of varying the wavelength of the light to be output.

The isolator 30 is configured to transmit light traveling from the light source 20 to the optical integrated circuitry 10 and to block light traveling from the optical integrated circuitry 10 to the light source 20. In other words, the isolator 30 is configured to prevent the light from returning to the light source 20 from the optical integrated circuitry 10.

The optical integrated circuitry 10 is integrated circuitry that integrally includes a substrate 11 and a structure layered over the substrate 11. For example, the optical integrated circuitry 10 may be structured as a publicly-known Planar Lightwave Circuit (PLC). In that situation, the substrate 11 may be a glass substrate or a silicon substrate, for example. Further, the structure provided over the substrate 11 includes a core and a cladding portion surrounding the core, for example. The cladding portion is manufactured by using a quartz-based glass material, whereas the core is manufactured by using a quarts-based glass material having a higher refractive index than the refractive index of the cladding portion. For example, the core may contain germania ($GeO_2$) or zirconia ($ZrO_2$) serving as a dopant for enhancing the refractive index. In the optical integrated circuitry 10, the core formed in the structure provided over the substrate 11 structures a waveguide 12. Alternatively, the optical integrated circuitry 10 may be a silicon photonics system including a waveguide structure manufactured by using a silicon-based material.

The optical integrated circuitry 10 includes a coupling element 13, a reference optical system 14, an irradiation optical system 15, and a coherent light output portion 16. The coupling element 13, the reference optical system 14, the irradiation optical system 15, and the coherent light output portion 16 are all structured with the waveguide 12.

The coupling element 13 is configured to branch the light from the light source 20 into reference light to be input to the reference optical system 14 and irradiation light to be input to the irradiation optical system 15. In other words, the coupling element 13 is configured to function as a branching portion.

The reference optical system 14 is configured to transmit the reference light. The reference optical system 14 includes a variable delayer 141, a variable optical attenuator 142, and a mirror 143. The reference light that has passed through the variable delayer 141 and the variable optical attenuator 142 is reflected by the mirror 143 and passes through the variable optical attenuator 142 and the variable delayer 141 again, to return to the coupling element 13.

The irradiation optical system 15 includes the waveguide 12 configured to transmit the irradiation light. The irradiation light that has passed through the waveguide 12 is output from an end part of the waveguide 12 at a facet 10*a* of the optical integrated circuitry 10 so that an object 200 is irradiated therewith. At least a part of reflection light of the irradiation light reflected by the object 200 is input to the waveguide 12. The reflection light passes through the waveguide 12 again, so as to be input to the coupling element 13. In other words, the irradiation optical system 15 is configured to transmit the irradiation light and the reflection light.

The coupling element 13 is configured to generate coherent light by causing the reference light from the reference optical system 14 and the reflection light from the irradiation optical system 15 to be coherent. In other words, the coupling element 13 is configured to function as a coherence portion.

As explained above, the coupling element 13 is configured to also function as a branching portion. In other words, the coupling element 13 is configured to function as a branching portion and a coherence portion. When a branching portion and a coherence portion are structured separately as described in Patent Literature 1, because there may be a difference in specifications such as dimensions between the branching portion and the coherence portion, which may lead to a difference between a branch ratio of the branching portion and a branch ratio of the coherence portion, there is a possibility that precision levels of measurement results may be degraded thereby. In contrast, according to the present embodiment, because the coupling element 13 functions as both the branching portion and the coherence portion, it is possible to eliminate the difference in the specifications between the branching portion and the coherence portion, and it is thus possible to eliminate the difference between the branch ratios. Consequently, it is possible to inhibit the degradation of the precision levels of the measuring processes which might be caused if the branching portion and the coherence portion were structured separately.

The coherent light from the coupling element 13 functioning as the coherence portion passes through the coherent light output portion 16 and is input to the detector 40. The detector 40 is configured to convert the coherent light into an electrical signal, to further perform an Analog/Digital (AD) conversion thereon, and to output a digital signal. The digital signal undergoes a Fourier analysis in a signal processing portion (not illustrated), so that a tomographic image of the object 200 is obtained.

Next, specific configuration examples of functional units of the optical integrated circuitry 10A (10) will be explained. FIG. 2 is a schematic plan view of the optical coherence tomograph 100A (100). The optical integrated circuitry 10, as a whole, expands while intersecting and being orthogonal to the Z direction. Further, the optical integrated circuitry 10 has a face 10*b* facing the Z direction. The face 10*b* may be referred to as a surface. In the optical integrated circuitry 10, the waveguide 12 extends while curving and intersecting the Z direction.

Figure 3:
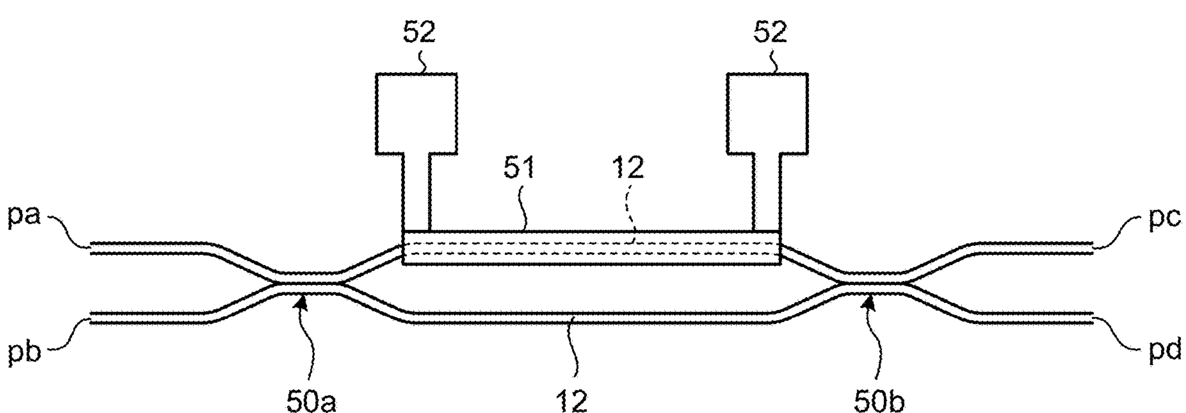
FIG. 3 is an illustrative and schematic configuration diagram of a Mach-Zehnder interferometer included in the optical coherence tomograph according to the first embodiment.

The coupling element 13 may be structured as a Mach-Zehnder interferometer 50, for example. FIG. 3 is a plan view illustrating a schematic configuration of the Mach-Zehnder interferometer 50. The Mach-Zehnder interferometer 50 includes two waveguides 12 and coupling portions 50*a* and 50*b* provided in two locations while having an interval therebetween, so as to each optically couple the two waveguides 12 together. The coupling portions 50*a* and 50*b* are each a coupling portion of which the branch ratio is 1:1 and may each be structured by using a directional coupler or a multi-mode interference (MMI) waveguide. In the Mach-Zehnder interferometer 50, the end parts on one end of the waveguides 12 serve as ports pa and pb, whereas the end parts on the other end of the waveguides 12 serve as ports pc and pd.

Further, the Mach-Zehnder interferometer 50 is provided with a heater 51 so that the heater 51 is able to heat one of the two waveguides 12 positioned between the coupling portions 50*a* and 50*b*. The heater 51 may be, for example, an electric heater including an electric resistor that generates heat while being energized and is configured to generate the heat when the section positioned between two terminals 52 is energized. In that situation, as a result of the heating by the heater 51, the refractive index of the heated waveguide 12 is changed. In this manner, by creating an appropriate optical path length difference between the light passing through the heated waveguide 12 and the light passing through the unheated waveguide 12, it is possible to eliminate the output of the port pd at the time of inputting light to the port pa. In that situation, for example, the branch ratio from the port pa to the port pd is 0(%).

When the Mach-Zehnder interferometer 50 in FIG. 3 is applied to the coupling element 13, the port pa is used as an input port for the light from the isolator 30 (the light source 20); the port pb is used as an output port for the light to the coherent light output portion 16; the port pc is used as an input/output port for the light to and from the reference optical system 14; and the port pd is used as an input/output port for the light to and from the irradiation optical system 15. In that situation, by applying the heat generated by the heater 51, it is possible to achieve a state in which no light is output from the port pd, without the need to stop the light output from the light source 20. As a result, it is possible to achieve a state in which no irradiation light is output from the irradiation optical system 15, by using a relatively simple configuration and relatively easily. In other words, the coupling element 13 is an example of a variable coupler capable of switching the branch ratio in the range of 0(%) to 100(%) and is able to function as a switch capable of stopping the output of the irradiation light.

Further, as illustrated in FIG. 2, as the variable delayer 141, the reference optical system 14 includes a curved waveguide 12 and a heater 141*a* configured to heat at least a part of the curved waveguide 12. With this configuration, with the heat generated by the heater 141*a*, it is possible to change the refractive index of the waveguide 12 and to change a delay amount for the reference light. Further, the optical integrated circuitry 10 is provided with a groove 141*b* recessed from the face 10*b* in the direction opposite to the Z direction. The groove 141*b* extends so as to surround the variable delayer 141 as viewed in the direction opposite to the Z direction. The groove 141*b* makes it possible to prevent heat from being transferred from the variable delayer 141 to the surroundings of the variable delayer 141. If heat was to escape from the variable delayer 141 to the surroundings thereof, there would be a possibility that heating efficiency of the heater 141*a* might be degraded, which might increase power consumption, and a waveguide 12 that is not supposed to be heated might be heated, and optical characteristics of the light passing through the waveguide 12 might inadvertently be changed. In contrast, according to the present embodiment, by using the relatively simple configuration where the groove 141*b* is provided, it possible to avoid the abovementioned inconvenient situation which might be caused if the heat were to escape to the surroundings of the variable delayer 141. The groove 141*b* is an example of the thermal insulation groove.

Further, the reference optical system 14 includes a Mach-Zehnder interferometer 50 having the same configuration as that in FIG. 3 as the variable optical attenuator 142, and includes a loop mirror as the mirror 143. The reference light that has reached the mirror 143 via the variable optical attenuator 142 is reflected by the mirror 143, passes through the variable optical attenuator 142 again to return to the variable delayer 141, and is input to the coupling element 13. The variable optical attenuator 142 also has a heater 51 (see FIG. 3). By adjusting the amount of heat applied by the heater 51, it is possible to vary the percentage of the reference light to be passed. In other words, the variable optical attenuator 142 is able to adjust how much percent of the reference light input from the coupling element 13 is to return to the coupling element 13, i.e., the power of the reference light to return to the coupling element 13. In this situation, possible embodiments of the mirror 143 are not limited to loop mirrors.

Further, the coherent light output portion 16 may be structured as an arrayed waveguide grating (AWG), for example. The coherent light output portion 16 includes a plurality of parallel waveguides 12 that function as channel waveguides and is capable of separating the coherent light according to different wavelengths. In the optical integrated circuitry 10, it is possible to configure the arrayed waveguide grating with a high level of precision.

In this situation, as illustrated in FIG. 2, unnecessary light is output from the variable optical attenuator 142 in a direction Ds (see FIG. 2). In the present embodiment, the direction Ds in which the unnecessary light is output is one of the X direction and the direction opposite to the X direction. When the unnecessary light (stray light) inadvertently propagates within the optical integrated circuitry 10 and reaches the coherent light output portion 16, there would be a possibility that precision levels of measuring processes might be degraded, which is not desirable. To cope with this situation, in the present embodiment, the coherent light output portion 16 is provided so as to be positioned apart from the variable optical attenuator 142 in a direction intersecting the direction Ds (the X direction), e.g., the direction opposite to the Y direction in an example. By using this configuration, it is possible to inhibit the degradation of the precision levels of the measuring process that may be caused by the unnecessary light from the variable optical attenuator 142.

As explained above, the optical coherence tomograph 100 according to the present embodiment includes the coupling element 13 configured to function as both the branching portion and the coherence portion. Consequently, according to the present embodiment, it is possible to inhibit the degradation of the precision levels of the measuring processes which might be caused if the branching portion and the coherence portion were structured separately.

Further, according to the present embodiment, the optical integrated circuitry 10 includes the Mach-Zehnder interferometer 50 as the coupling element 13, includes the variable delayer 141 structured with the waveguides 12, includes the Mach-Zehnder interferometer 50 as the variable optical attenuator 142, includes the loop mirror as the mirror 143, and includes the AWG as the coherent light output portion 16. By using these constituent elements, it is possible to realize the optical integrated circuitry 10 and thereby the optical coherence tomograph 100, with a configuration that is more compact and has higher mass productivity.

Second Embodiment

Figure 4:
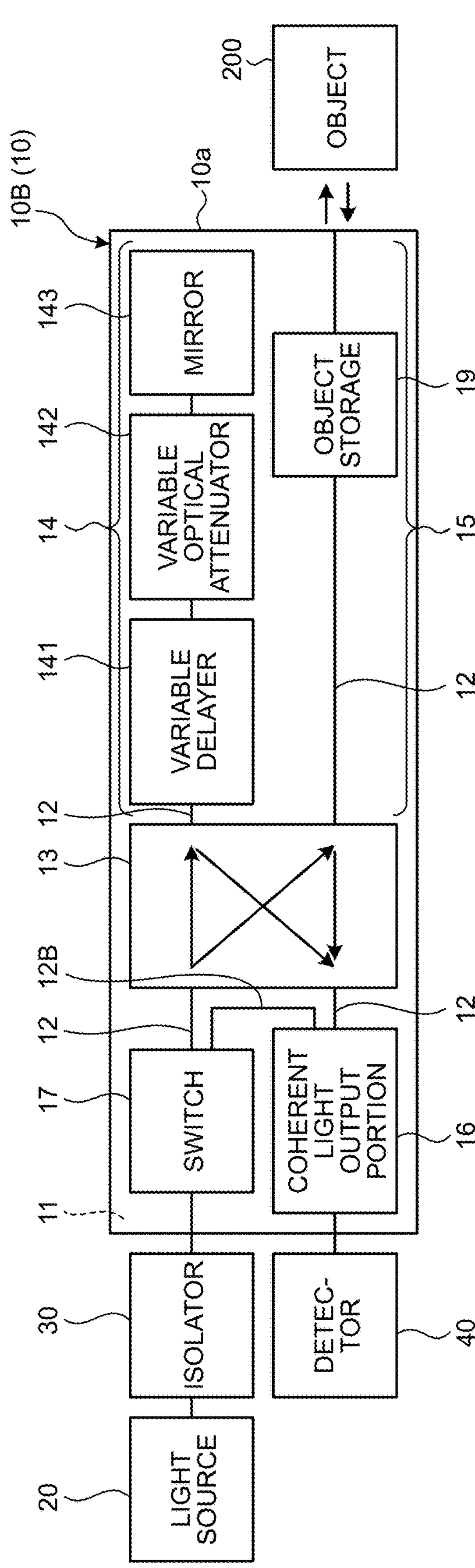
FIG. 4 is an illustrative block diagram of an optical coherence tomograph according to a second embodiment.

FIG. 4 is a block diagram illustrating a schematic configuration of an optical coherence tomograph 100B (100) according to a second embodiment. The optical coherence tomograph 100B according to the present embodiment has a configuration similar to that of the optical coherence tomograph 100A according to the first embodiment. Thus, the present embodiment is also able to achieve the same or similar advantageous effects achieved by the first embodiment described above.

However, it should be noted that, in the present embodiment, a switch 17 is provided. The switch 17 is provided in an optical integrated circuitry 10B (10) so as to be interposed between the light source 20 and the coupling element 13. The switch 17 is configured to switch between a mode in which the light from the light source 20 is input to the coupling element 13 and another mode in which the light is input to the coherent light output portion 16 via a waveguide 12B. When the switch 17 inputs the light from the light source 20 to the coherent light output portion 16 so that the detector 40 detects the light from the coherent light output portion 16, it is possible to check optical characteristics of the coherent light output portion 16 itself. With this configuration, for example, it is possible to calibrate the measuring and to correct measurement results, for example.

FIG. 5 is a schematic plan view of the optical coherence tomograph 100B (100). As illustrated in FIG. 5, the switch 17 includes a switch 17*a* structured as a Mach-Zehnder interferometer 50 and a matching agent storage 18.

The switch 17*a* also has a heater 51 (see FIG. 3). By switching heating states of the heater 51, it is possible to vary the branch ratio of the light. More specifically, the switch 17*a* is capable of switching between a mode in which, regarding the light input from the light source 20, 100(%) of the light is directed to the coupling element 13 while 0(%) of the light is directed to the coherent light output portion 16 and another mode in which 0(%) of the light is directed to the coupling element 13 while 100(%) of the light is directed to the coherent light output portion 16. With this arrangement, for example, before performing a measuring process using the optical coherence tomograph 100B, it is possible to test the coherent light output portion 16 by using a configuration in which the percentage of the light to be directed to the coherent light output portion 16 is 100(%). On the basis of a result of the test, it is possible to calibrate the measuring and to correct measurement results.

Further, for example, the matching agent storage 18 is formed, in the optical integrated circuitry 10B, as a bottomed recessed part having an opening in the face 10*b* and is configured to be able to store therein a refractive index matching agent such as matching oil. In this situation, for example, by setting specifications as appropriate, such as a refractive index of the refractive index matching agent and dimensions of the matching agent storage 18, it is possible to configure the optical integrated circuitry 10B so that the light from the light source 20 is transmitted to the coherent light output portion 16 via the matching agent storage 18 while the refractive index matching agent is stored and so that the light from the light source 20 is diffused by the matching agent storage 18 so as not to be transmitted to the coherent light output portion 16 while no refractive index matching agent is stored. With this configuration, for example, during measuring processes, it is possible to prevent light leakage from the switch 17 to the coherent light output portion 16 with higher certainty.

Further, in the present embodiment, the irradiation optical system 15 is provided with an object storage 19 capable of storing the object 200. The object storage 19 is formed, in the optical integrated circuitry 10B, as a bottomed recessed part having an opening in the face 10*b* and is configured to be able to store therein the object 200. With this configuration, for example, it is possible to determine the position of the object 200 within a certain range in advance. Thus, it is possible to perform measuring processes with a higher level of precision more easily or more quickly, as compared to the situation where the object 200 is positioned outside the optical integrated circuitry 10B (the optical coherence tomograph 100).

Further, in the present embodiment, the object storage 19 is provided in the irradiation optical system 15 while being positioned between the coupling element 13 and the facet 10*a* of the optical integrated circuitry 10B, i.e., an end part (an output terminal) of the waveguide 12 in the optical coherence tomograph 100B. With this configuration, for example, by setting specifications as appropriate, such as a refractive index of the refractive index matching agent and dimensions of the object storage 19, it is possible to configure the optical integrated circuitry 10B so that the irradiation light and the reflection light are transmitted via the object storage 19, while the object 200 is not stored, but the refractive index matching agent is stored. In that situation, similarly to the first embodiment, the irradiation light from the coupling element 13 passes through the waveguide 12, the object storage 19, and the waveguide 12, is output from the end part of the waveguide 12 at the facet 10*a* of the optical integrated circuitry 10 so that the object 200 is irradiated therewith, and at least a part of the reflection light of the irradiation light reflected by the object 200 is input to the waveguide 12. The reflection light again passes through the waveguide 12, the object storage 19, and the waveguide 12 and is input to the coupling element 13.

In contrast, while the object 200 is stored in the object storage 19, the irradiation light from the coupling element 13 is emitted onto the object 200 from the end part of the waveguide 12 facing the object storage 19, and at least a part of the reflection light of the irradiation light reflected by the object 200 is input to the waveguide 12 from the end part. The reflection light again passes through the waveguide 12 and is input to the coupling element 13.

Consequently, according to the present embodiment, the optical coherence tomograph 100B is capable of performing the measuring processes both when the object 200 is positioned so as to face the output terminal of the waveguide 12 and when the object 200 is stored in the object storage 19.

A number of embodiments of the present disclosure have thus been explained. However, the embodiments described above are merely examples and are not intended to limit the scope of the invention. It is possible to carry out the above embodiments in other various forms. It is possible to apply thereto various types of omissions, replacements, combinations, and changes without departing from the gist of the invention. Furthermore, it is possible to carry out the invention by changing, as appropriate, any of the configurations and specifications such as shapes (e.g., structures, types, directions, models, sizes, lengths, widths, thicknesses, heights, quantities, positional arrangements, positions, materials, etc.).

For example, the coupling element may be realized by using a configuration different from the Mach-Zehnder interferometer, such as a directional coupler or an MMI, for instance.

Further, the posture of the variable optical attenuator and the layouts of the variable optical attenuator and the coherent light output portion and the like are not limited to those in the embodiments described above. The configurations, the postures, the positional arrangements, and the like of the other functional units are not limited to those described in the above embodiments, either.

It is possible to apply the present disclosure to optical coherence tomographs.

According to the present disclosure, for example, it is possible to provide the optical coherence tomograph that is novel and improved so as to make it possible to inhibit the degradation of the precision levels of the measuring processes that may be caused by a manufacture variance or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical coherence tomograph comprising:

a light source configured to output light, the light source being configured to vary a wavelength of the light to be output;

a branching portion configured to separate the light from the light source into irradiation light and reference light;

a reference optical system configured to transmit the reference light from the branching portion;

an irradiation optical system configured to transmit the irradiation light from the branching portion so that an object is irradiated therewith, and transmit reflection light of the irradiation light reflected by the object;

a coherence portion configured to generate coherent light by causing the reflection light from the irradiation optical system and the reference light from the reference optical system to be coherent;

a coherent light output portion configured to output the coherent light; and a coupling element configured to function as the branching portion and the coherence portion, wherein the reference optical system, the coupling element, and the coherent light output portion are structured with a waveguide formed over a substrate and are integrated over the substrate;

wherein the reference optical system includes a variable optical attenuator structured with a waveguide, and an arrayed waveguide grating is positioned apart from the variable optical attenuator in a direction intersecting a direction in which unnecessary light is output from the variable optical attenuator.

2. The optical coherence tomograph according to claim 1, wherein the coupling element is a variable coupler configured to vary a branch ratio in a range of 0(%) to 100(%).

3. The optical coherence tomograph according to claim 1, wherein the reference optical system includes a loop mirror structured with a waveguide.

4. The optical coherence tomograph according to claim 1, wherein the reference optical system includes a variable optical attenuator structured with a waveguide.

5. The optical coherence tomograph according to claim 1, wherein the reference optical system includes a variable delayer structured with a waveguide.

6. The optical coherence tomograph according to claim 5, wherein the variable delayer includes a heater, and a thermal insulation groove surrounding the variable delayer is provided.

7. The optical coherence tomograph according to claim 1, wherein the coherent light output portion includes an arrayed waveguide grating.

8. The optical coherence tomograph according to claim 1, further comprising a switch provided between the light source and the coupling element, the switch being configured to switch between a mode in which the light from the light source is input to the coupling element and another mode in which the light from the light source is input to the coherent light output portion, wherein the switch is structured with a waveguide provided over the substrate and is integrated over the substrate.

9. The optical coherence tomograph according to claim 8, wherein, a matching agent storage configured to store a refractive index matching agent is provided between the switch and the coherent light output portion.

10. The optical coherence tomograph according to claim 1, wherein the irradiation optical system is provided with an object storage configured to store the object.

11. The optical coherence tomograph according to claim 10, wherein, in the irradiation optical system, the object storage is provided between the coupling element and an output terminal of the optical coherence tomograph for the irradiation light, and the object storage is configured so that, while the object is not stored in the object storage, it is possible to cause the light from the coupling element to pass through the object storage so as to be output from the output terminal.

12. The optical coherence tomograph according to claim 11, wherein the object storage is configured to store a refractive matching agent.

* * * * *